(12) United States Patent
Toliyat et al.

(10) Patent No.: US 11,476,786 B2
(45) Date of Patent: Oct. 18, 2022

(54) METHOD AND SYSTEM FOR BRUSHLESS WOUND FIELD SYNCHRONOUS MACHINES

(71) Applicant: The Texas A&M University System, College Station, TX (US)

(72) Inventors: Hamid A. Toliyat, College Station, TX (US); Matthew C. Gardner, Dallas, TX (US); Dorsa Talebi, College Station, TX (US)

(73) Assignee: The Texas A&M University System, College Station, TX (US)

(*) Notice: Subject to any disclaimer, the term of this patent is extended or adjusted under 35 U.S.C. 154(b) by 0 days.

(21) Appl. No.: 17/236,764

(22) Filed: Apr. 21, 2021

(65) Prior Publication Data
US 2021/0336574 A1 Oct. 28, 2021

Related U.S. Application Data

(60) Provisional application No. 63/013,618, filed on Apr. 22, 2020.

(51) Int. Cl.
*H02K 19/12* (2006.01)
*H02P 25/20* (2006.01)
*H02K 19/14* (2006.01)

(52) U.S. Cl.
CPC ............. *H02P 25/20* (2013.01); *H02K 19/12* (2013.01); *H02K 19/14* (2013.01)

(58) Field of Classification Search
CPC ........... H02P 25/20; H02P 6/32; H02K 19/12; H02K 19/14
See application file for complete search history.

(56) References Cited

U.S. PATENT DOCUMENTS

2003/0080643 A1* 5/2003 Kusase .................. H02K 19/28
310/179

FOREIGN PATENT DOCUMENTS

CN 2754264 Y * 1/2006

* cited by examiner

*Primary Examiner* — Karen Masih
(74) *Attorney, Agent, or Firm* — Winstead PC

(57) ABSTRACT

An electric machine includes a stator having a stator winding disposed thereon. A rotor is electromagnetically exposed to the stator. A field winding and an induction winding are disposed on the rotor. A rectifier is electrically coupled to the induction winding and the field winding. Upon application of a voltage to the stator winding, the stator winding produces a first rotating magnetic field and a second rotating magnetic field that has a different spatial frequency than the first rotating magnetic field. The first rotating magnetic field interacts asynchronously with the induction winding to produce an alternating current in the induction winding. The rectifier changes the alternating current to a direct current that is supplied to the field winding. The field winding interacts synchronously with the second rotating magnetic field.

20 Claims, 16 Drawing Sheets

METHOD AND SYSTEM FOR BRUSHLESS WOUND FIELD SYNCHRONOUS MACHINES

CROSS-REFERENCE TO RELATED APPLICATIONS

This application claims priority to, and incorporates by reference the entire disclosure of, U.S. Provisional Patent Application No. 63/013,618, filed on Apr. 22, 2020.

TECHNICAL FIELD

The present disclosure relates generally to electric machines and more particularly, but not by way of limitation to electric machines having a field winding that is wirelessly supplied by an induction winding and to electric machines having a stator that can produce magnetic flux with multiple spatial harmonics.

BACKGROUND

This section provides background information to facilitate a better understanding of the various aspects of the disclosure. It should be understood that the statements in this section of this document are to be read in this light, and not as admissions of prior art.

Wound field synchronous machines provide excellent performance at both low-torque, high-speed and high-torque, low-speed operating points and only require relatively simple control. However, the brushes and slip rings required to supply current to the rotor increase the required maintenance. Existing solutions to eliminate the brushes include adding an extra section of the machine to wirelessly transfer power to the rotor or include using existing harmonics in the machine or injecting additional harmonics into the machine to excite current on the rotor.

SUMMARY

Aspects of the disclosure relate to a rotary or linear electric machine. The electric machine includes a stator having a stator winding disposed thereon. A rotor is electromagnetically exposed to the stator. A field winding and an induction winding are disposed on the rotor. A rectifier is electrically coupled to the induction winding and the field winding. Upon application of a voltage to the stator winding, the stator winding produces a first rotating magnetic field and an independently controlled second rotating magnetic field with a different spatial frequency than the first rotating magnetic field. The first rotating magnetic field interacts asynchronously with the induction winding to produce an alternating current in the induction winding. The rectifier changes the alternating current to a direct current that is supplied to the field winding. The field winding interacts synchronously with the second rotating magnetic field.

Aspects of the disclosure relate to a method of generating torque utilizing an electric machine. The method includes applying a voltage to a stator winding. A first rotating magnetic field is produced from the stator winding and A second rotating magnetic field is produced from the stator winding. The second rotating magnetic field has a different spatial frequency than the first rotating magnetic field. An alternating current is induced in an induction winding in a rotor through asynchronous interaction of the induction winding with the first rotating magnetic field. The alternating current is rectified to a direct current. The direct current is supplied to a field winding on the rotor. Torque is produced through synchronous interaction of the field winding with the second rotating magnetic field. Additional torque can be produced through asynchronous interaction of the induction winding with the first rotating magnetic field.

Aspects of the disclosure relate to an electric powertrain the electric powertrain includes a multiphase inverter and an electric machine electrically coupled to the multiphase inverter. The electric machine includes a stator having a stator winding disposed thereon and a rotor. A field winding is disposed on the rotor and an induction winding is disposed on the rotor. A rectifier is electrically coupled to the induction winding and the field winding. Upon application of a voltage to the stator winding, the stator winding produces a first rotating magnetic field and an independently controlled second rotating magnetic field that has a different spatial frequency than the first rotating magnetic field. The first rotating magnetic field interacts asynchronously with the induction winding to produce an alternating current in the induction winding. The rectifier changes the alternating current to a direct current that is supplied to the field winding and the field winding interacts synchronously with the second rotating magnetic field.

This summary is provided to introduce a selection of concepts that are further described below in the Detailed Description. This summary is not intended to identify key or essential features of the claimed subject matter, nor is it to be used as an aid in limiting the scope of the claimed subject matter.

BRIEF DESCRIPTION OF THE DRAWINGS

A more complete understanding of the subject matter of the present disclosure may be obtained by reference to the following Detailed Description when taken in conjunction with the accompanying Drawings wherein.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

Electric motors are an integral part of every powertrain of electric and hybrid electric vehicles, i.e. land, air, and sea. Various embodiments disclosed herein aim at removing slip rings in wound field synchronous motors by wirelessly powering the field winding of a wound field synchronous machine. Removal of slip rings will reduce the size and maintenance requirements of these types of motors significantly. Additionally, removal of slip rings allows more space for active materials and thus more powerful motors. However, transferring current to the field winding on the rotor is a challenge for wound field synchronous machines. The conventional solution, using brushes, is difficult to employ in traction applications because of the required maintenance and because the brushes may create a spark in the oil being used to cool the machine. In order to transfer power to the rotor to excite the field winding without brushes, most other systems use a rotating transformer such as, for example, an axial rotating transformer, which adds to the size, weight, and cost of the machine.

In various embodiments, an electric motor includes a stator and a rotor (or translator in the case of linear machines), each of which has electrically conductive windings that will produce magnetic flux when carrying current. The rotor (or translator) may also possess various electronic components to rectify or control the current that is excited by the stator flux. Various embodiments make use of pole-phase modulation to produce independently-controlled rotating magnetic fields for the purpose of exciting currents on the rotor (or translator) for the purpose of exciting a DC field winding on the rotor.

Aspects of the disclosure relate to a heavy rare-earth free synergistically excited brushless wound field synchronous machine for a low-cost electric traction drive system. The brushless wound field synchronous machine uses a winding arrangement that integrates a wound rotor induction machine with a wound field synchronous machine. The rotor currents in the wound rotor induction machine are rectified to supply the field current to the wound field synchronous machine. Such an arrangement eliminates the need for any brushes or slip rings.

Figure 1:
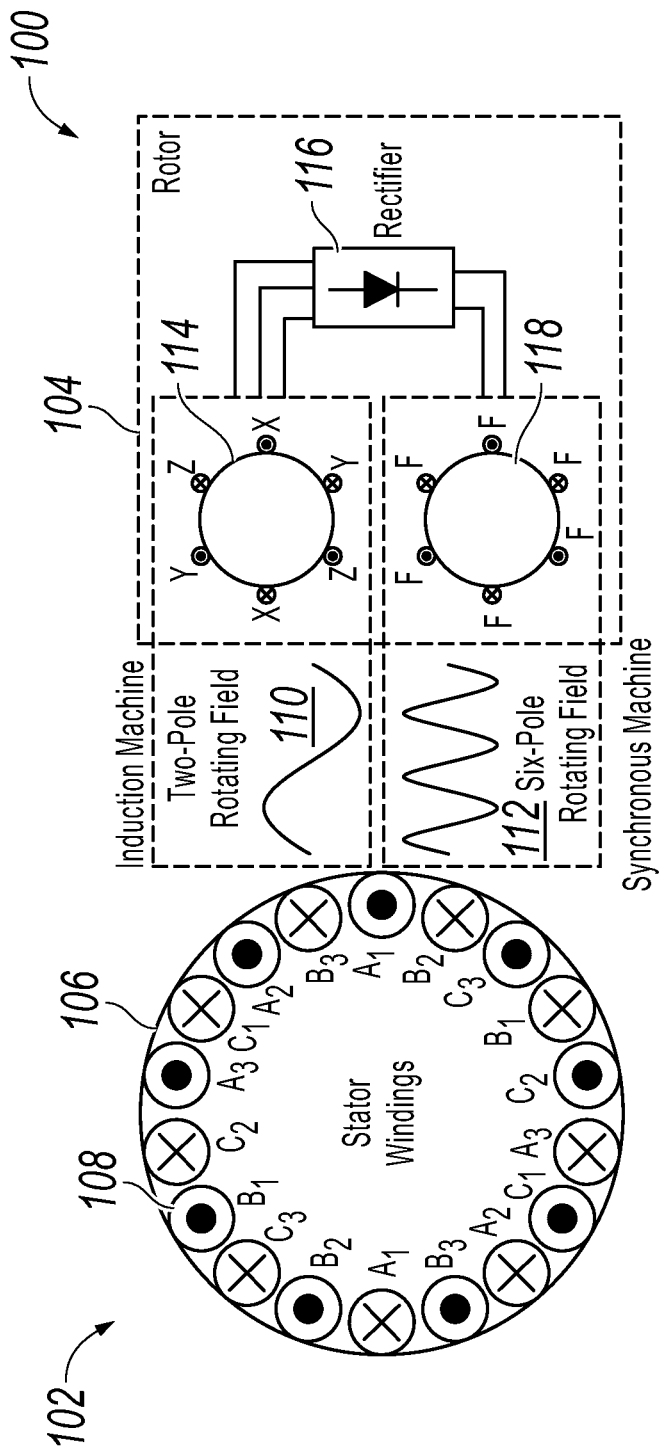
FIG. 1 is a schematic diagram of a synergistically excited brushless wound field synchronous machine according to aspects of the disclosure.

FIG. 1 is a schematic diagram of a synergistically excited brushless wound field synchronous machine 100. Most brushless electric machines currently are permanent magnet machines, which contain a large amount of expensive rare-earth magnets. Additionally, permanent magnet machines have high losses when operating at high speeds, as in cruising. The brushless wound field synchronous machine 100 avoids the use of rare-earth magnets and can reduce the field strength to reduce losses at high speeds.

Still referring to FIG. 1, the synergistically excited brushless wound field synchronous machine 100 includes a stator 102 and a rotor 104 that is separated from the stator 102 by an axial gap. The stator 102 includes a stator iron 106 and a stator winding 108. By way of example, the synergistically excited brushless wound field synchronous machine 100 illustrated in FIG. 1 includes a stator 102 with a stator winding 108 capable of operating as a nine-phase, two-pole winding and as a three-phase, six pole winding; however, other winding patters may be utilized in order to produce a first rotating magnetic field 110 at the fundamental frequency and a second rotating magnetic field 112 that has a different spatial frequency than the first rotating magnetic field 110. In various embodiments, the stator windings could be, for example, full pitch or fractional pitch. In various other embodiments, different pole counts could be utilized. For example, a stator winding 108 that operates as a 25-phase, 2-pole winding and as a 5-phase, 10-pole winding could be utilized. Additionally, in other exemplary embodiments, a stator winding 108 that operates as a 49-phase, 2-pole winding and as a 7-phase, 14-pole winding could be utilized.

Still referring to FIG. 1, the rotor 104 includes an induction winding 114. In various embodiments, the induction winding 114 is a three-phase, two pole winding; however, in other embodiments, other winding patters could be utilized provided that the induction winding 114 responds to the first rotating magnetic field 110. The induction winding is electrically coupled to a rectifier 116. In various embodiments, the rectifier 116 is an electronic rectifier such as, for example, a diode bridge. In other embodiments, a controlled rectifier including transistors or thyristors may be utilized. The rectifier 116 is electrically coupled to a field winding 118. The field winding 118 is a single-phase winding and has the same number of poles as the second rotating magnetic field 112. In the embodiment illustrated in FIG. 1, the field winding 118 is a single-phase, six-pole winding that rotates synchronously with the second rotating magnetic field produced by the stator winding 108.

Still referring to FIG. 1, in various embodiments, the first rotating magnetic field will be used to generate current in the induction windings 114 of the rotor 104. This current is rectified by the rectifier 116 and supplied to the field winding 118 of the rotor 104. The winding 118 interacts with the second rotating magnetic field produced by the stator 102 in order to provide torque. Furthermore, the interaction of the induction winding 114 with the first rotating magnetic field acts as an induction machine to provide additional torque. In the example synergistically excited brushless wound field synchronous machine 100 shown in FIG. 1, the stator 102 can simultaneously operate as a nine-phase, two-pole winding and as a three-phase, six-pole winding with decoupled control of the two-pole and six-pole fields. The first rotating magnetic field, which in this example is a rotating two-pole field, produced by the stator 102 induces AC currents in the two-pole, three-phase induction winding 114 on the rotor 104, which produces torque. These AC currents are rectified on the rotor 104 to produce DC current in the six-pole, single-phase field winding 118 on the rotor 104. When excited by a DC current, the field winding interacts with the second rotating magnetic field, which, in this example is a rotating six-pole field, produced by the stator 102 to produce additional torque.

Still referring to FIG. 1, in various embodiments, the brushless wound field synchronous machine 100 could include multiple stators 102, multiple rotors 104, or multiple stators 102 and multiple rotors 104. In other embodiments, in the case of linear machines, the rotor 104 could be replaced with a translator that moves in a linear manner relative to the stator 102.

Figure 2A:
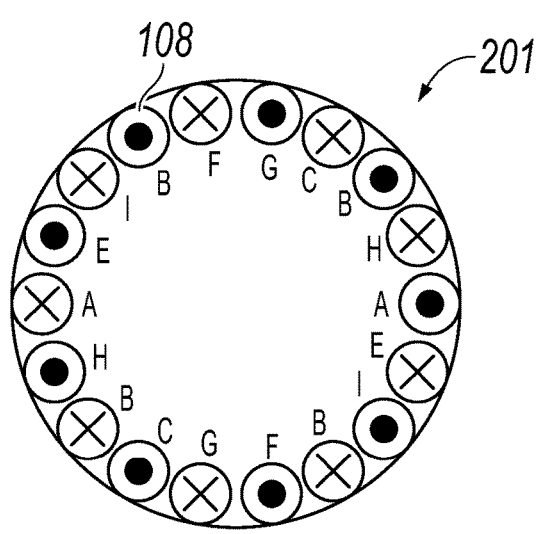
FIG. 2A is a winding diagram of stator having a nine-phase, two-pole winding according to aspects of the disclosure.
Figure 2B:
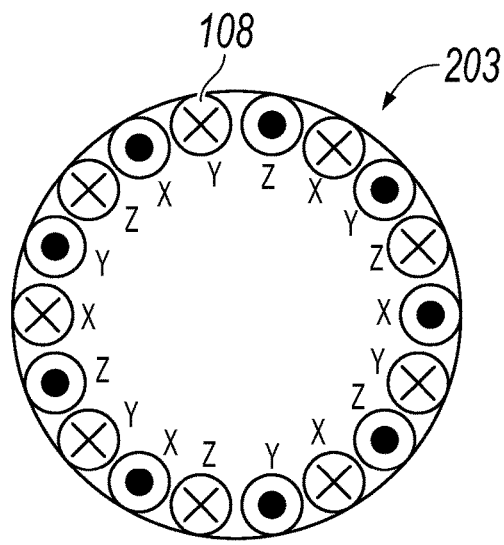
FIG. 2B is a winding diagram of a stator having a three-phase, six-pole winding according to aspects of the disclosure.
Figure 2C:
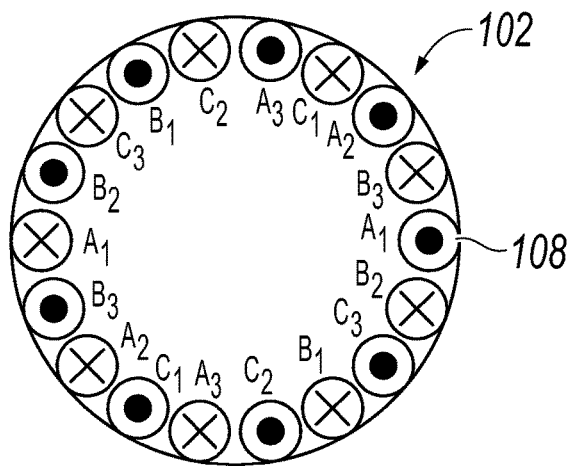
FIG. 2C is a winding diagram of a stator capable of producing a two-pole magnetic field and a six-pole magnetic field according to aspects of the disclosure.

FIG. 2A is a winding diagram of a stator 201 having a nine-phase, two-pole winding. FIG. 2B is a winding diagram of a stator 203 having a three-phase, six-pole winding. Because the nine-phase, two-pole winding of the stator 201 and three-phase, six pole windings of the stator 203 have conductors in the same locations, the windings of the stator 201 and the windings of the stator 203 can be combined into a single winding, which can simultaneously produce both a two-pole rotating magnetic field and a six-pole rotating magnetic field. FIG. 2C is a winding diagram of the stator 102 capable of producing a two-pole magnetic field and a six-pole magnetic field. Referring to FIGS. 2A-2C, depending on the design specification, different combinations of pole counts can be created for the two spatial harmonics using different numbers of slots and phases. In various embodiments, there could be a single coil per slot or multiple coils per slot. In this example, a nine-phase winding is used to simultaneously produce 6-pole and 2-pole magnetic flux harmonics with independent rotational speeds and flux magnitudes. However, other embodiments, including but not limited to a nine-phase winding capable of simultaneously producing rotating 12-pole and 4-pole magnetic fields, are possible.

FIG. 2A shows the winding arrangement of a motor with nine phases and two poles and FIG. 2B shows a three-phase, six-pole winding arrangement. Both of these motors have coils in the same positions, so by adding the currents in each coil from the two machines the resultant winding configuration is iA+iX, iB+iX, iC+iX, iD+iY, iG+iZ, etc. FIG. 2C introduces a new winding consisting of three sets of three phases, $A_1B_1C_1$, $A_2B_2C_2$, and $A_3B_3C_3$, which serves as a single nine-phase machine that produces independently controlled two-pole and six-pole fields.

Still referring to FIG. 2C, interaction of the first rotating magnetic field with the induction winding 114 of the rotor 104 functions as a rotating transformer. The rotating transformer serves as an induction machine and will be integrated with the rest of the brushless wound field synchronous machine 100 such that the rotating transformer shares the same stator windings, stator steel, and rotor steel, mitigating the impact of the rotating transformer on the total cost and size of the brushless wound field synchronous machine 100. In order to achieve this sharing of the same components, the stator 102 will, in various embodiments, have nine phases grouped into three sets of three phases. These nine phases will generate the first rotating magnetic field with the fundamental spatial frequency when operated as a conventional multiphase machine. Injecting zero-sequence current into any of the three phase sets as one embodiment will produce a six-pole spatial harmonic. This six-pole spatial harmonic will be rotated using the zero sequence currents injected into each three phase set. Thus, the stator 102 will be able to generate the first rotating magnetic field at the fundamental spatial frequency and the second rotating magnetic field with the six-pole spatial harmonic, and the speed and magnitude of these two rotating fields can be controlled independently.

Figure 3:
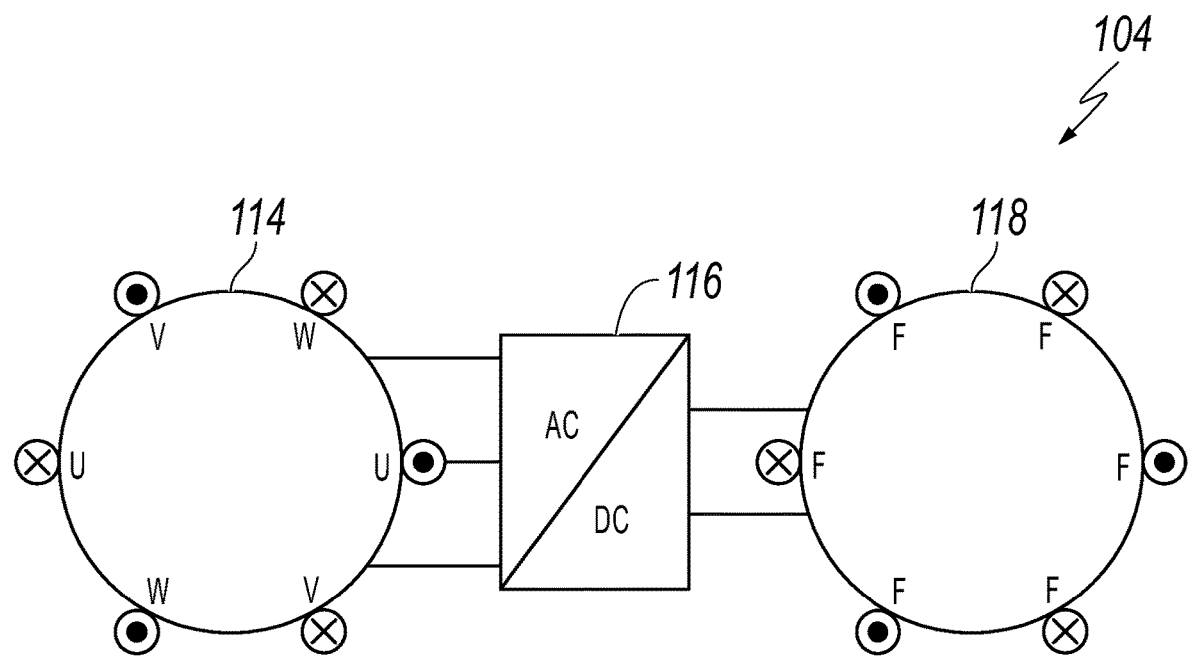
FIG. 3 is a schematic diagram of a rotor according to aspects of the disclosure.

FIG. 3 is a schematic diagram of the rotor 104. The induction winding 114 is electrically coupled to the field winding 118 via the rectifier 116. During operation, the first rotating magnetic field 110 induces an alternating current in the induction winding 114. The alternating current has a frequency that is equal to the fundamental frequency of the first rotating magnetic field 100. The induction winding 114 is electrically coupled to the rectifier 116. The rectifier 116 converts the alternating current to direct current and supplies the rectified direct current to the field winding 118. The voltage induced in the rotor induction winding 114 is rectified to supply a DC current in the rotor field winding 118. This DC current serves as the field current for a synchronous machine, producing torque when interacting with the second magnetic field 112 of the stator 102. Thus, the independent control over the two spatial flux harmonics provides independent control over the field current and armature flux of the synchronous machine.

Figure 4A:
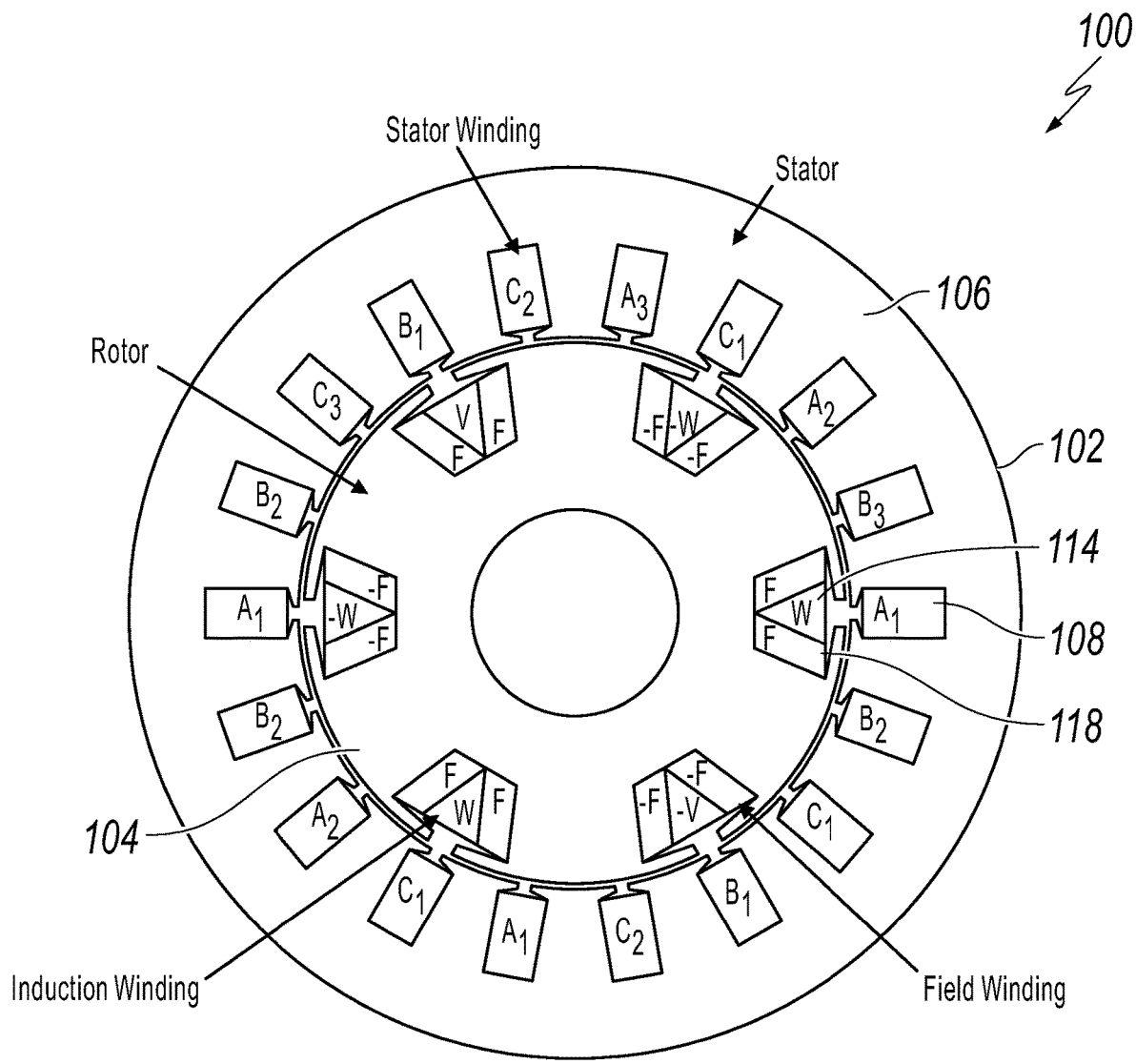
FIG. 4A is a cross-sectional view of a brushless wound field synchronous machine according to aspects of the disclosure.

FIG. 4A is a cross-sectional view of the brushless wound field synchronous machine 100. The stator windings 108 are arranged radially around an interior of the stator iron 106. By way of example, the brushless wound field synchronous machine 100 shown in FIG. 4A illustrates a stator winding 108 that is capable of functioning as a two-pole winding and a six-pole winding; however, in other embodiments, other winding patterns could be utilized. The stator winding 108 produces the first rotating magnetic field 110 and the second rotating magnetic field 112.

Still referring to FIG. 4A, the rotor 104 includes the induction winding 114 and the field winding 118. In various embodiments, the induction winding 114 is a two-pole winding and the field winding 118 is a six-pole winding. During operation, the first rotating magnetic field 110 produced by the stator 102 rotates asynchronously to induce a current in the rotor induction winding 114, which, in various embodiments, may be, for example, a two-pole, three-phase winding. Second, the field winding 118 is connected via the rectifier 116, for example, a three-phase rectifier to the rotor induction winding 118, which, in various embodiments, may be, for example, a two-pole winding. The DC rectified current serves as the synchronous motor field current and interacts with the second magnetic field 112 produced by the stator 102, which, in various embodiments, may be, for example a synchronous six-pole harmonic flux in order to produce torque. In various embodiments, the magnitudes, speeds, and phase angles of the first rotating magnetic field 110 and the second rotating magnetic field 112 can be controlled independently. Additionally, the use of separate and independent harmonics to excite the field current and as the armature current will reduce torque ripple, vibrations, and acoustic noise.

Figure 4B:
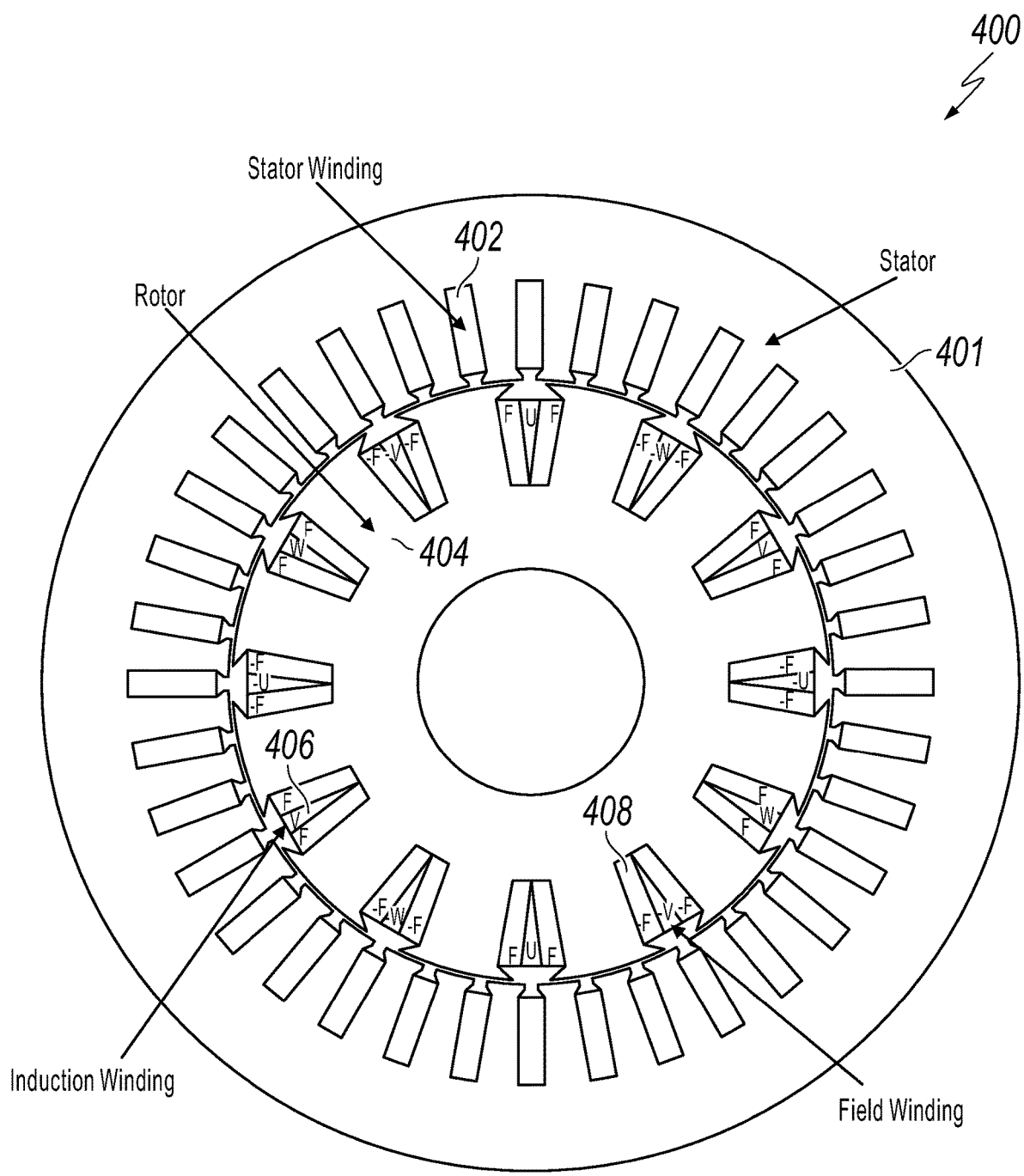
FIG. 4B is a cross-sectional view of a brushless wound field synchronous machine with an inner rotor configuration according to aspects of the disclosure.
Figure 4C:
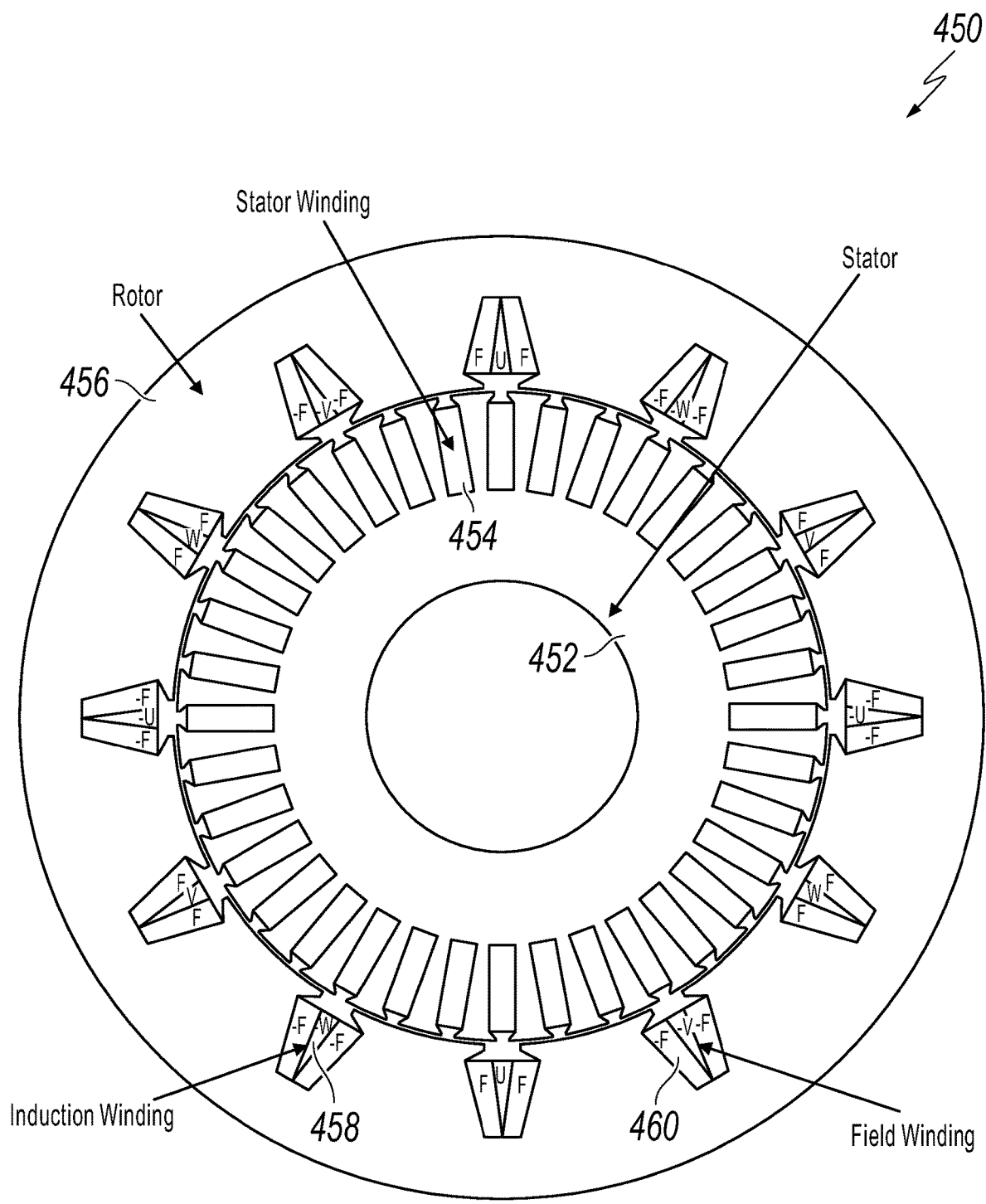
FIG. 4C is a cross-sectional view of a brushless wound field synchronous machine with an outer rotor configuration according to aspects of the disclosure.

FIG. 4B is a cross-sectional view of a brushless wound field synchronous machine 400 with an inner rotor configuration. FIG. 4C is a cross-sectional view of a brushless wound field synchronous machine 450 with an outer rotor configuration. The brushless wound field synchronous machine 400 and the brushless wound field synchronous machine 450 are capable of producing a four-pole magnetic field and a twelve-pole magnetic field with 36 stator slots.

FIG. 4B is an example of cross-sectional view of the brushless wound field synchronous machine 400. In this inner rotor configuration, the stator 401 includes stator windings 402 are arranged to produce simultaneously four-pole and nine-phase for induction operation and twelve-pole and three-phase of synchronous operation. The rotor 404 is equipped with one set of four-pole induction winding 406 which is connected through a rectifier to the twelve-pole field winding 408.

FIG. 4C provides another example of a 36 slots stator 452 but with an outer rotor configuration. The stator windings 454 are capable of producing four-pole and nine-phase for induction operation and twelve-pole and three-phase of synchronous operation. The outer rotor 456 is equipped with a four-pole induction winding 458 and twelve-pole field winding 460. Although the provided examples in FIGS. 4A-4C are single layer integral-slot windings, other embodiments could include, for example, fractional-slot windings or windings with multiple coils per slot are possible.

Figure 5A:
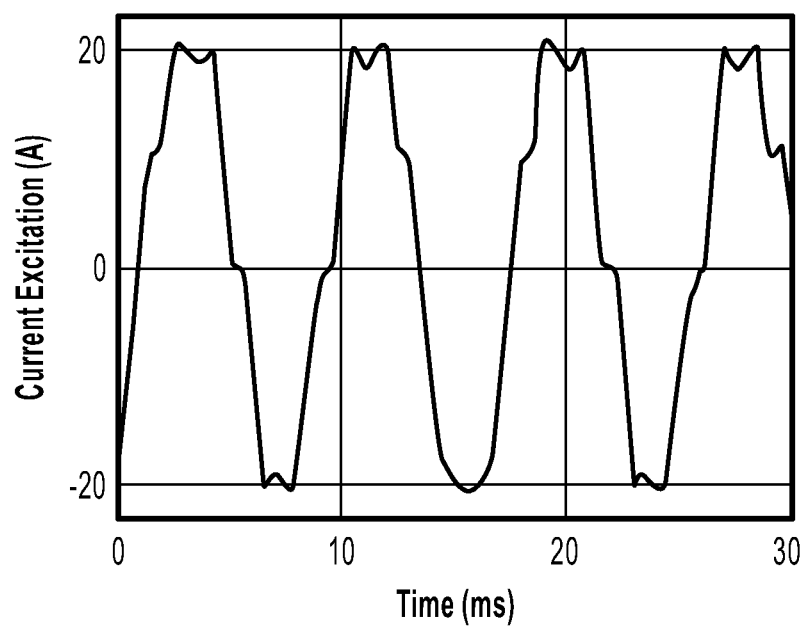
FIG. 5A is a graph of induced current on the rotor induction windings according to aspects of the disclosure.
Figure 5B:
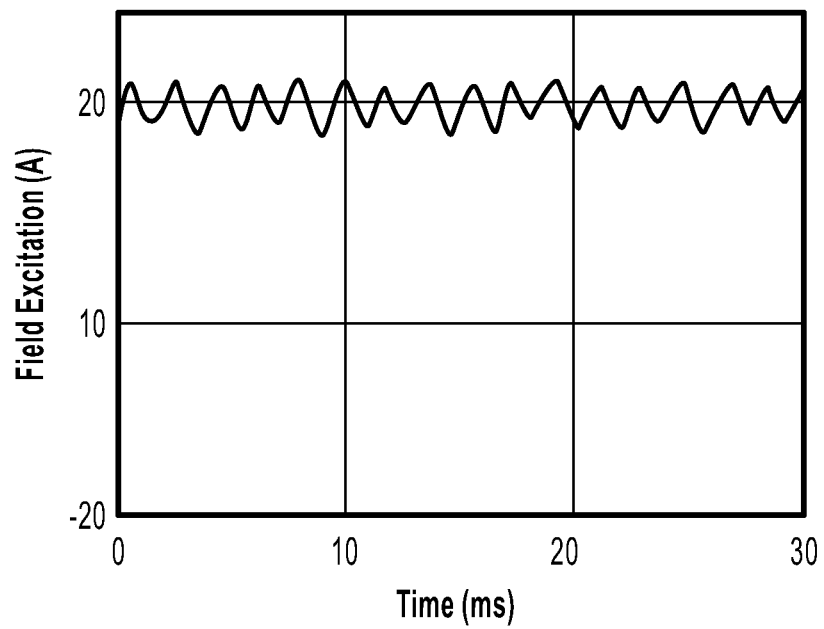
FIG. 5B is a graph of field-winding current according to aspects of the disclosure.

Referring to FIGS. 4A-4C, the excitation of each winding on the stator, represents the both current excitation components with separate amplitude and frequency on the two-pole and six-pole arrangement. Based on the operating principles of an induction machine, for example, a three-phase voltage is induced from the two-pole current excitation of the first magnetic field 110 with slip frequency of 120 Hz, based on the 150 Hz excitation and the 1800 rpm rotor speed. FIG. 5A shows the induced current on one of the rotor induction windings with 120 Hz frequency and FIG. 5B shows the field current, which is rectified from the rotor induction currents.

The brushless wound field synchronous machine 100 provides a low-cost design because the brushless wound field synchronous machine 100 avoids rare-earth magnets, while avoiding the need for brushes or a separate rotating transformer. Additionally, the brushless wound field synchronous machine 100 provides excellent capability for field weakening, which allows the brushless wound field synchronous machine 100 to operate efficiently at high speeds. Furthermore, the brushless wound field synchronous machine 100 will be compatible for use with standard six-switch inverters. In such an embodiment, the brushless wound field synchronous machine 100 could be electrically coupled to a multiphase inverter to form an electric powertrain. In various embodiments, the multiphase inverter could include multiple three-phase inverters.

Most brushless electric machines currently are permanent magnet machines, which contain a large amount of expensive rare-earth magnets. Additionally, permanent magnet machines have high losses when operating at high speeds, as in cruising. The brushless wound field synchronous machine 100 avoids the use of rare-earth magnets and can reduce the field strength to reduce losses at high speeds. However, transferring current to the field winding on the rotor is a challenge for wound field synchronous machines. The conventional solution, using brushes, is difficult to employ in traction applications because of the required maintenance and because the brushes may create a spark in the oil being used to cool the machine. In order to transfer power to the rotor to excite the field winding without brushes, most other systems use a rotating transformer such as, for example, an axial rotating transformer, which adds to the size, weight, and cost of the machine.

Experimental Results

Figure 6A:
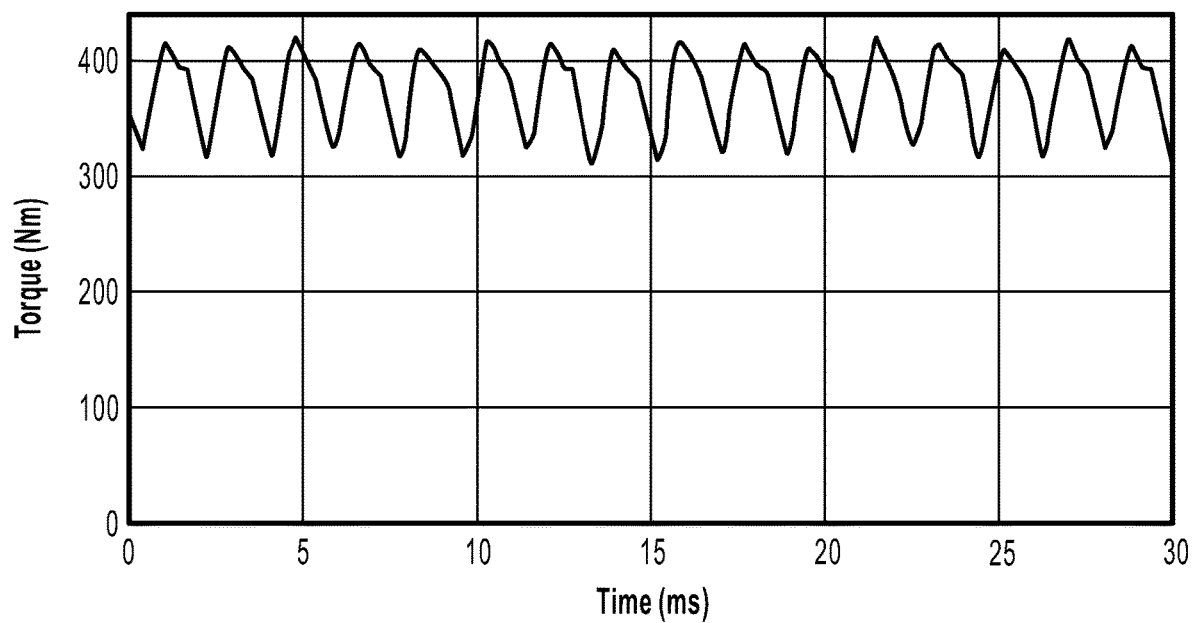
FIG. 6A is a graph of torque produced by the synergistically excited brushless wound field synchronous machine according to aspects of the disclosure.

The electromagnetic torque produced by the brushless wound field synchronous machine 100 is shown in FIG. 6A. This torque includes the torques of two machines, a synchronous machine, created through the interaction of the field winding 118 with the second rotating magnetic field, and an asynchronous machine, created through the interaction of the induction winding 114 with the first rotating magnetic field. In order to separate these torques, a new set of simulations were defined. To model the synchronous-only machine, the currents in the induction windings 114 were set to zero, and the field winding was fed by a DC current source based on the average field current observed in the brushless wound field synchronous machine 100. Additionally, the stator 102 was excited with only the synchronous component of the stator current. Similarly, the asynchronous-only machine was set up with zero current in the field winding 118, and the output of the rectifier 116 was instead connected to an equivalent resistance and inductance. In this case, the stator 102 was excited with only the asynchronous component of the stator current.

Figure 6B:
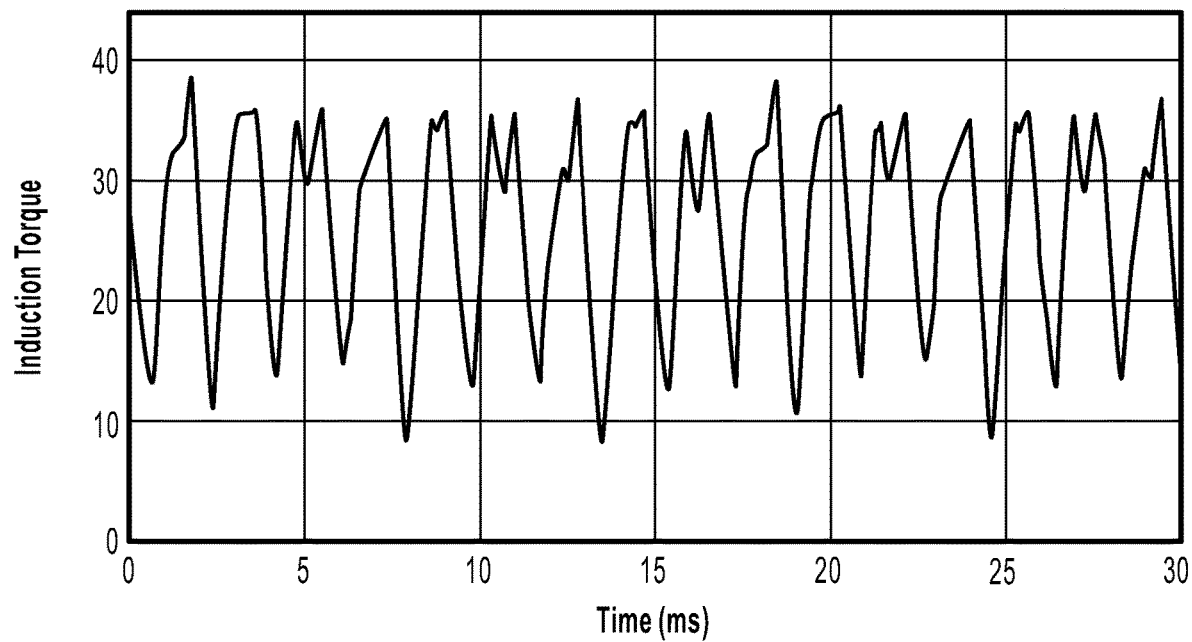
FIG. 6B is a graph of torque produced by the asynchronous portion of the synergistically excited brushless wound field synchronous machine according to aspects of the disclosure.
Figure 6C:
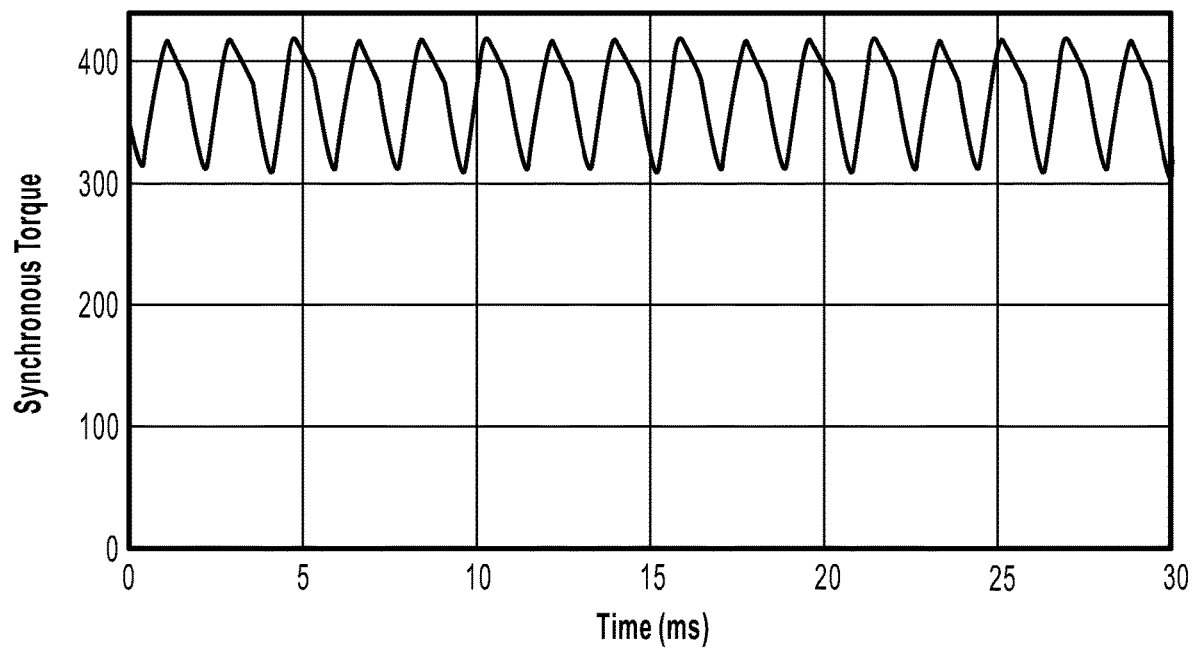
FIG. 6C is a graph of torque produced by the synchronous portion of the synergistically excited brushless wound field synchronous machine according to aspects of the disclosure.
Figure 6D:
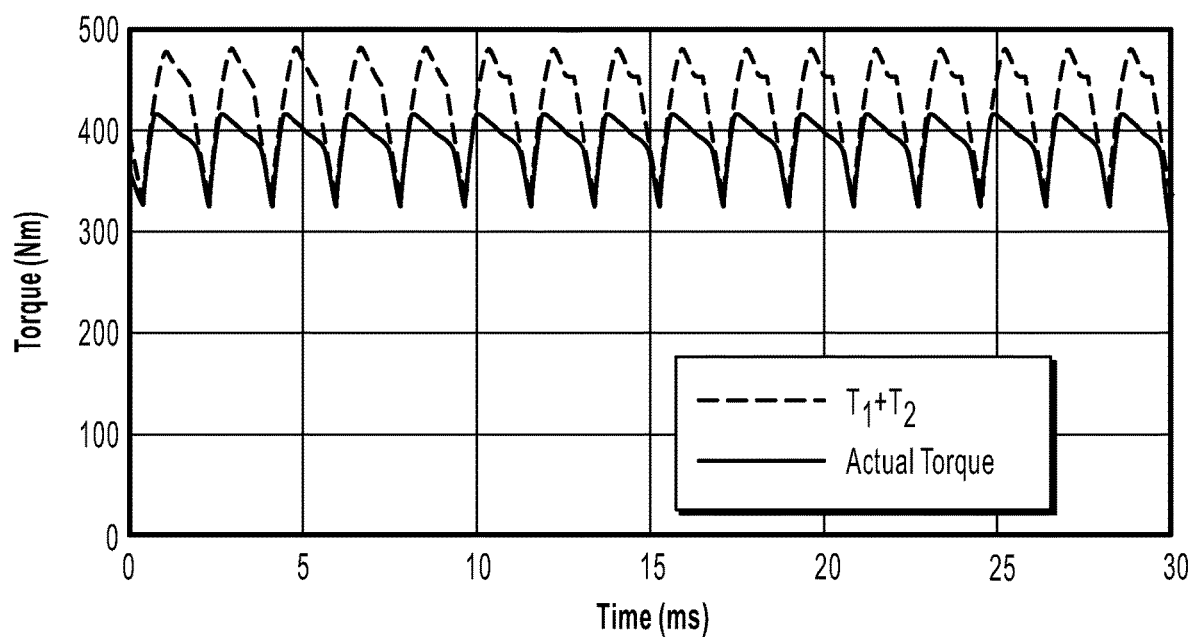
FIG. 6D is a comparison of the sum of synchronous and asynchronous torques according to aspects of the disclosure.

FIGS. 6B and 6C show the torques produced by the asynchronous and synchronous portions of the machine, respectively. FIG. 6D compares the sum of the torques produced by the separate asynchronous and synchronous machines shown in FIGS. 6B and 6C with the torque produced by the whole machine shown in FIG. 6A. The average of actual torque of the brushless wound field synchronous machine 100 is 374 Nm while the average of the sum of the asynchronous and synchronous torques from the separate simulations is 420 Nm.

FIG. 6D shows that the average torque produced by the brushless wound field synchronous machine 100 is about 11% lower than the average sum of the synchronous and asynchronous torques. The previous simulations were repeated using a linear magnetic field v. magnetic flux density curve (BH curve) for the stator 102 and the rotor 104, instead of the nonlinear steel BH curves used in previous simulations, to model the brushless wound field synchronous machine 100 without saturation. Table I summarizes the results of both the linear and nonlinear simulations.

TABLE I

Comparison of Linear and Saturated Simulations

| Operations | RMS Stator Current (A) | | Avg Torque (No Saturation) (Nm) | Avg Torque (Saturation) (Nm) |
| --- | --- | --- | --- | --- |
| | $I_1$ | $I_2$ | | |
| Synchronous | — | 85.5 | 1241 | 395 |
| Asynchronous | 22.1 | — | 17 | 27 |
| Complete | 22.1 | 85.5 | 1258 | 374 |

For the case without saturation, the sum of the asynchronous and synchronous torques almost exactly matches the torque of the complete brushless wound field synchronous machine 100. Thus, saturation is the cause of the discrepancy in FIG. 6D. Such behavior reveals an inherent disadvantage of the induction excitation scheme for brushless wound field synchronous machines: the flux required to excite the rotor current reduces the amount of flux that can be used for primary synchronous operation. Thus, although the induction excitation scheme eliminates the need for adding an extra section to the motor for the purposes of rotor current excitation, it can reduce the torque density of the motor itself, especially when operating in highly saturated conditions. In the case of the brushless wound field synchronous machine 100, this is partially mitigated by using the asynchronous excitation of the rotor currents to generate some small positive torque.

The stator current is a sum of two different current waveforms, one of which is used to generate the synchronous harmonic and the other generates the asynchronous harmonic, which is used to excite the field winding 118 of the rotor 104. There are two parameters that can be used to control the field current. The first parameter is the magnitude of the stator current used to generate the asynchronous harmonic. For a fixed stator current density, this is reflected in the asynchronous current distribution (ACD). The second parameter that can be used to control the field current is the slip frequency of the asynchronous harmonic. Thus, the magnitude and frequency of the two different current waveforms facilitate independent control of the first rotating magnetic field and the second rotating magnetic field.

Figure 7A:
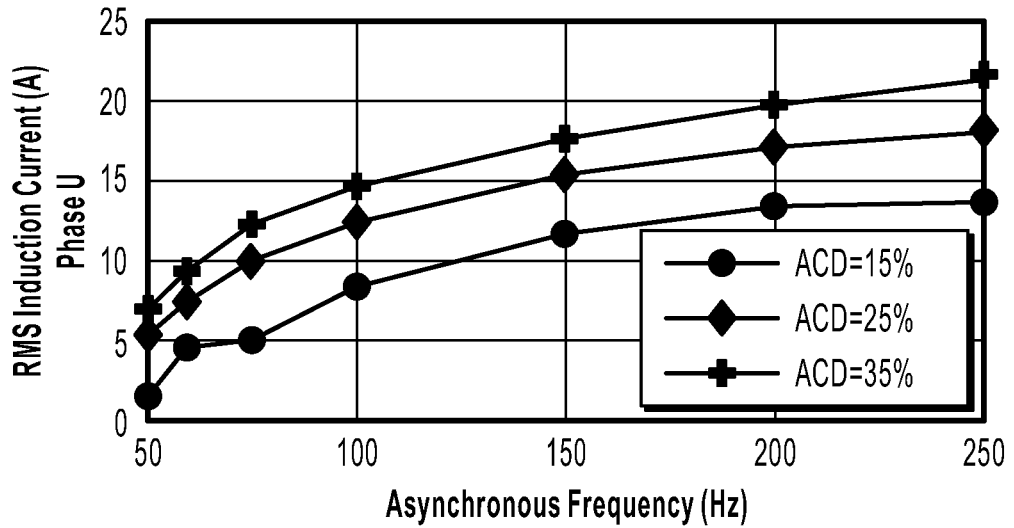
FIG. 7A illustrates the impact of current distribution and asynchronous current harmonic frequency on induced current in the rotor induction winding.
Figure 7B:
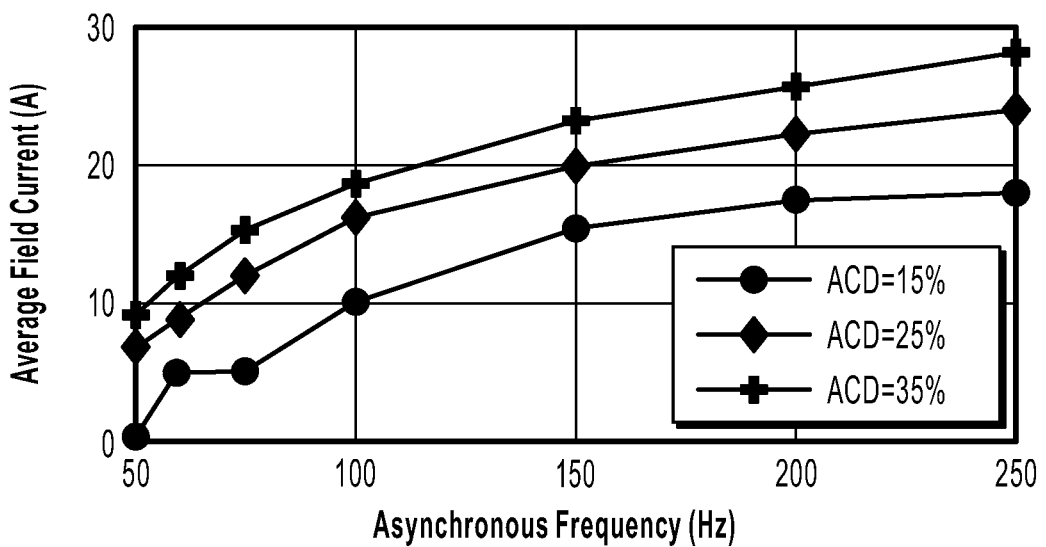
FIG. 7B illustrates the impact of current distribution and asynchronous current harmonic frequency on induced rotor field current.
Figure 7C:
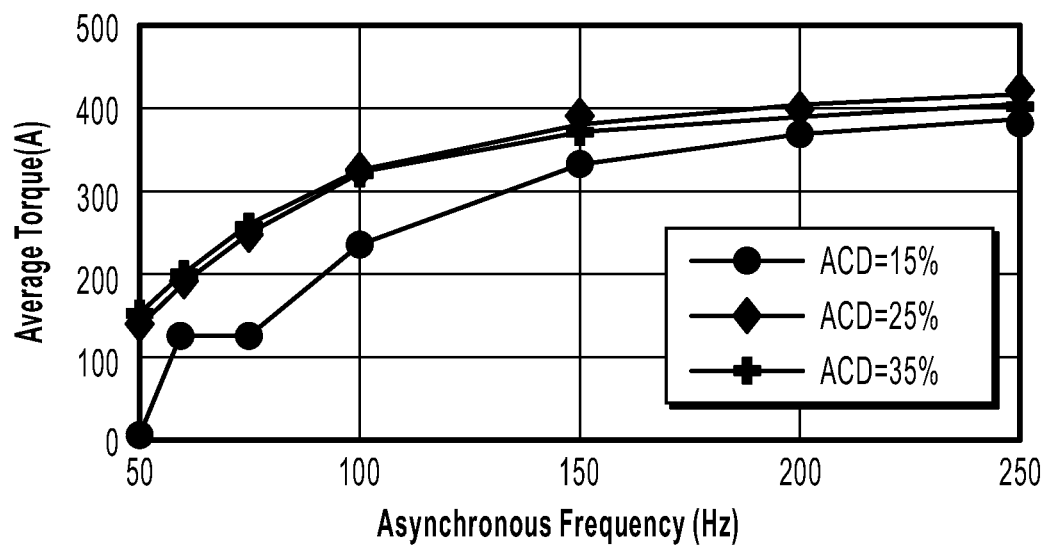
FIG. 7C illustrates the impact of current distribution and asynchronous current harmonic frequency on average machine torque.

FIGS. 7A-7C shows the impacts of varying these two parameters for simulations with ACD of 15%, 25%, and 35% at asynchronous current frequencies from 50 Hz to 250 Hz. Increasing the magnitude of either the asynchronous current or the slip frequency will increase the induced current in the induction winding 114 of the rotor 104, as shown in FIG. 7A, which increases the average field current, as shown in FIG. 7B. Since the torque of a synchronous machine is proportional to the current flowing in the stator winding times the rotor flux, which is proportional to the field current if saturation is neglected, the increase in field current in FIG. 7B is generally reflected by an increase in average torque in FIG. 7C. However, increasing the asynchronous component of the stator current reduces the synchronous component of the stator current for a fixed stator current density. Together with the impact of saturation, this means that the highest asynchronous current component does not always produce the highest overall torque. On the other hand, increasing the asynchronous frequency may increase the voltages the inverter is required to supply.

Figure 8A:
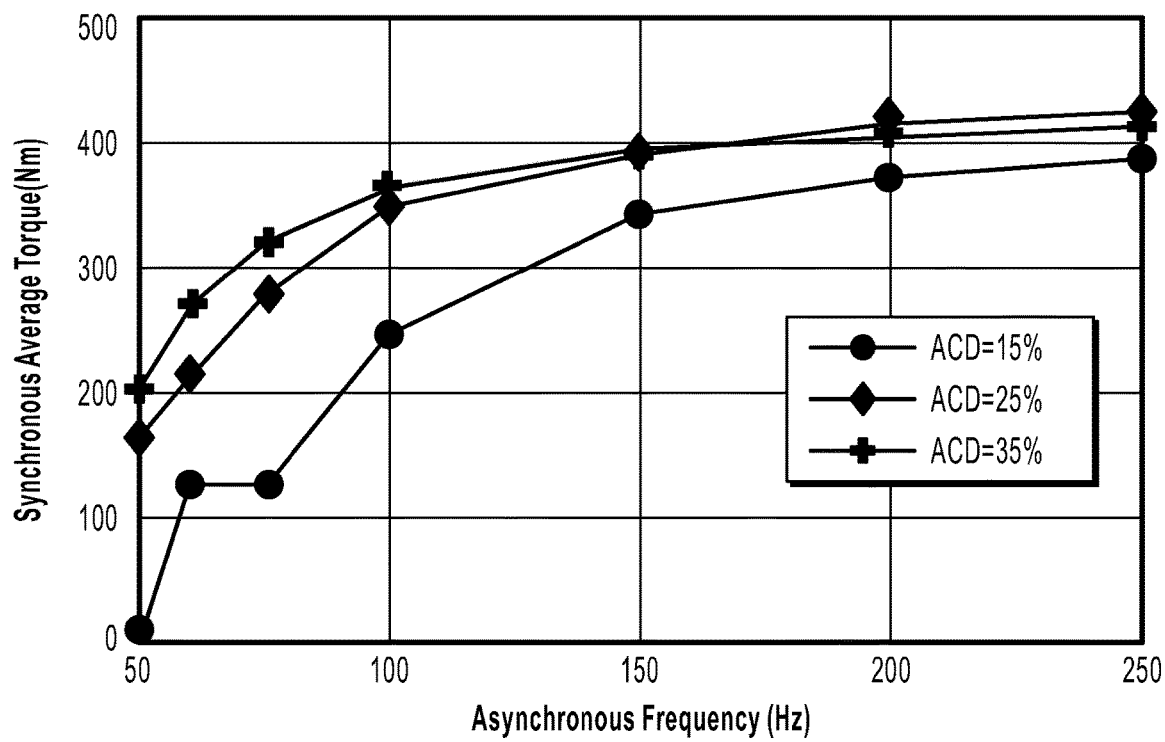
FIG. 8A illustrates the impact of asynchronous current distribution and asynchronous current harmonic frequency on torque produced by the synchronous portion of the synergistically excited brushless wound field synchronous machine.
Figure 8B:
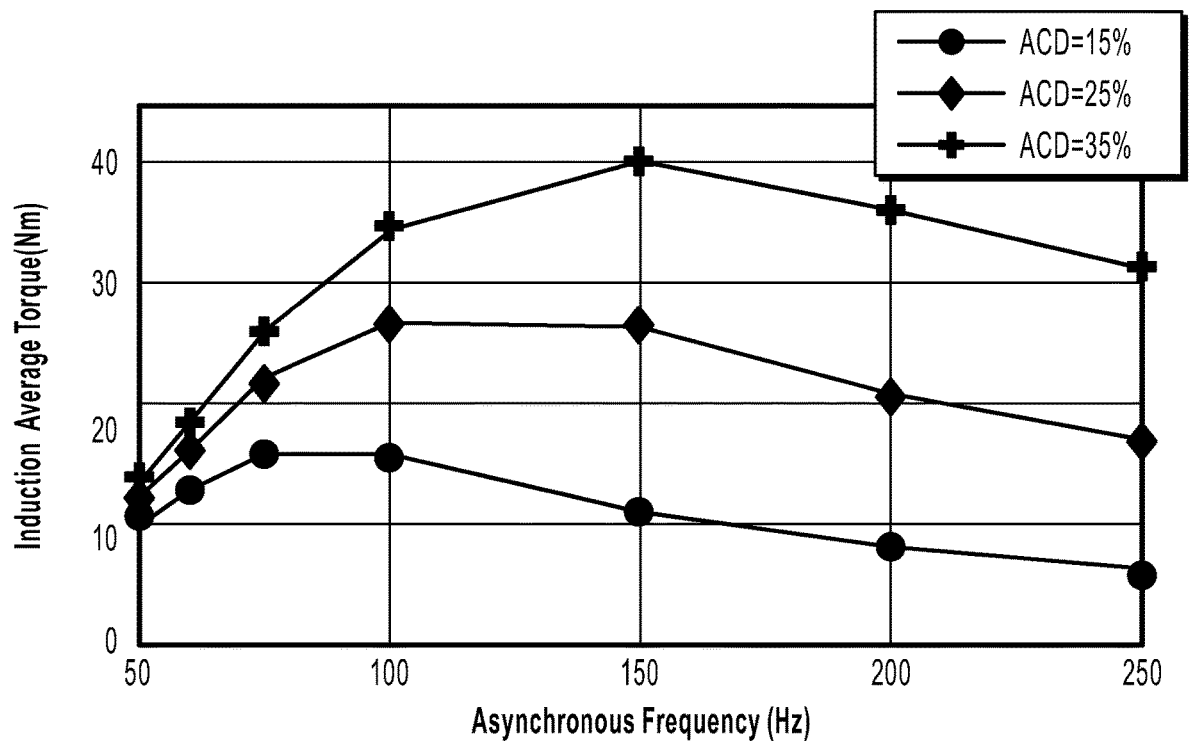
FIG. 8B illustrates the impact of asynchronous current distribution and asynchronous current harmonic frequency on torque produced by the asynchronous portion of the synergistically excited brushless wound field synchronous machine.

FIGS. 8A and 8B represent the impacts of the asynchronous frequency and ACD on the synchronous and induction torques. The synchronous torque follows a similar pattern to the overall average torque in FIG. 7C. However, the induction torque behaves differently; increasing the ACD consistently increases the induction torque. Additionally, the induction torque is maximized at some nontrivial slip frequency.

Figure 9A:
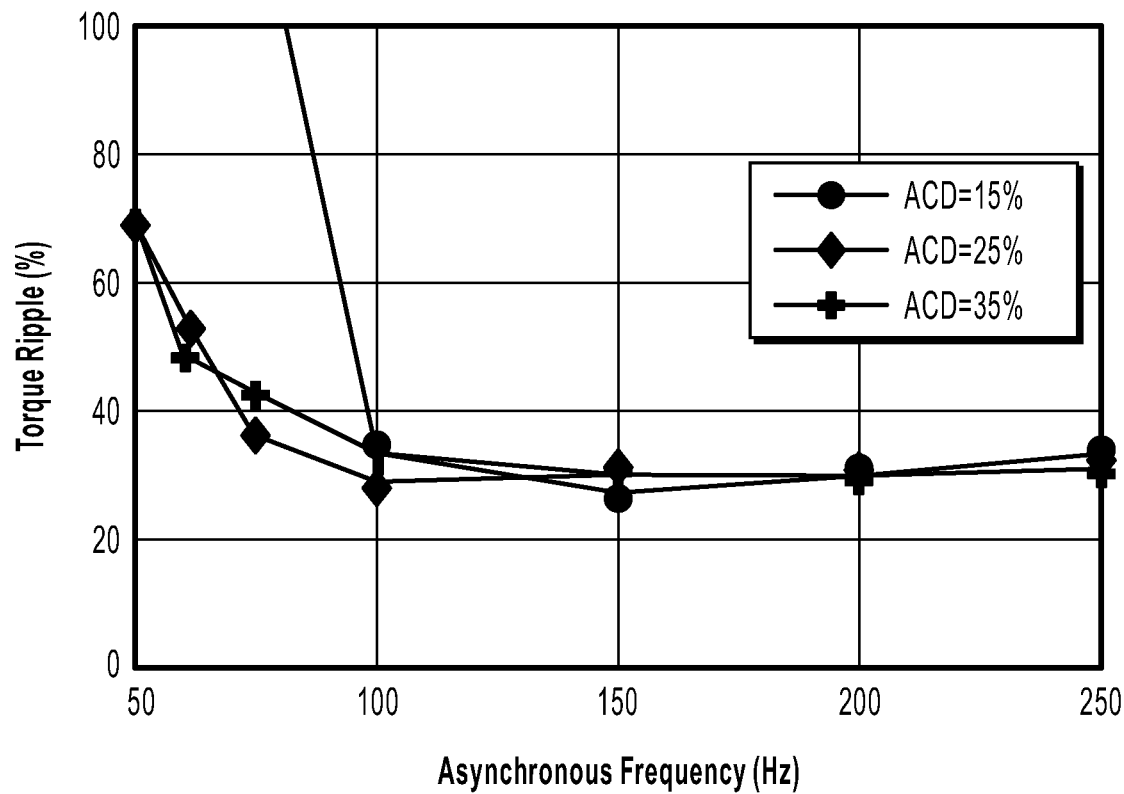
FIG. 9A illustrates the impact of asynchronous current distribution and asynchronous current harmonic frequency on torque ripple.

FIG. 9A shows the torque ripple as a percentage of the average torque for the same asynchronous frequency and ACD variation. As shown in FIG. 7C, the average torque is small at low slip frequencies, which causes the torque ripple to be a significant percentage. On the other hand, for at higher slip frequencies, the larger average torque reduces the significance of the torque ripple as a percentage. Additionally, higher slip frequencies reduce the current ripple in the rectified field current. However, as shown in FIG. 9A, increasing the asynchronous frequency beyond 150 Hz does not significantly improve the torque ripple. This occurs because, at that point, the dominant component of the torque ripple results from the slotting harmonics.

Figure 9B:
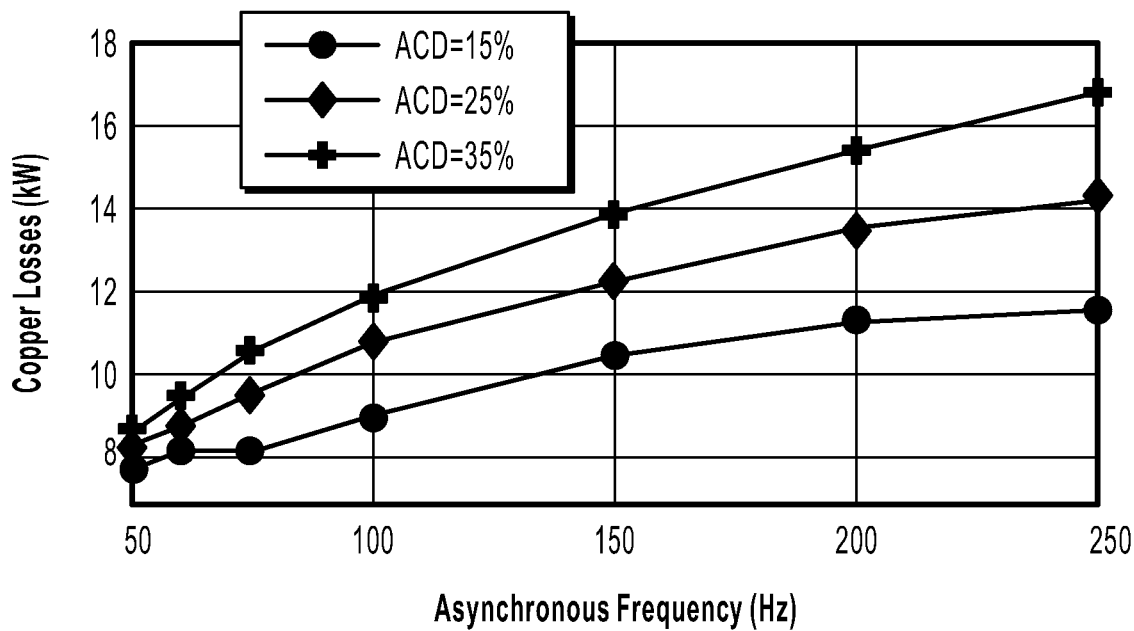
FIG. 9B illustrates the impact of asynchronous current distribution and asynchronous current harmonic frequency on copper losses.

FIG. 9B shows how changing ACD and asynchronous frequency affect the copper losses. The advantage of being able to control the field current through either the ACD or slip frequency should allow the controller optimize efficiency over a wide range of operating points. A comparison of FIGS. 7C and 10B indicates that operating at a higher slip frequency with a lower ACD may be the optimal way to achieve a target torque with minimal copper losses.

Figure 10A:
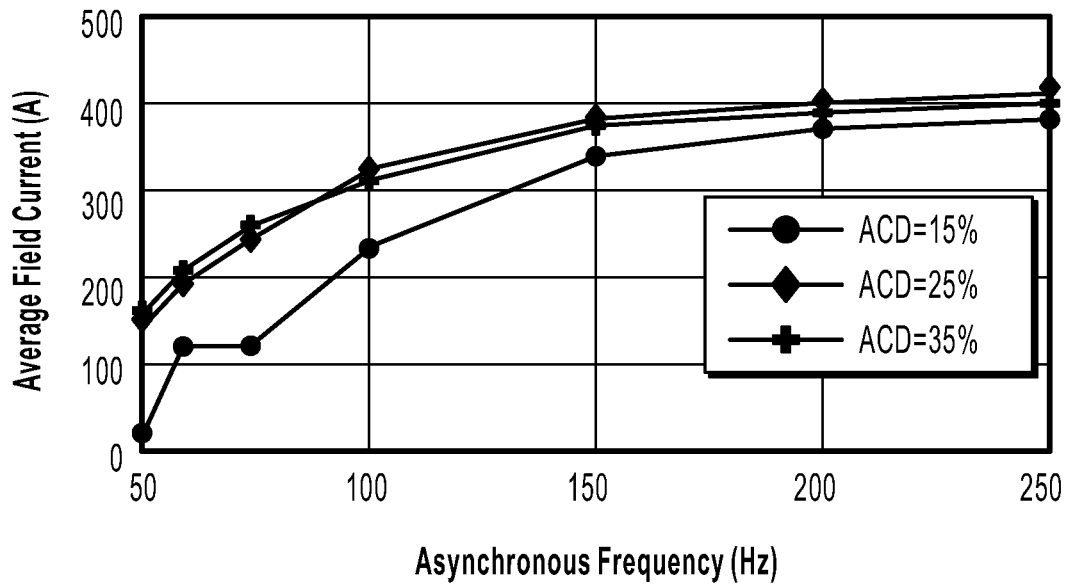
FIG. 10A illustrates the impact of current distribution and asynchronous harmonic frequency with linear magnetic field v. magnetic flux density curve (BH curve) characteristics on average machine torque.
Figure 10B:
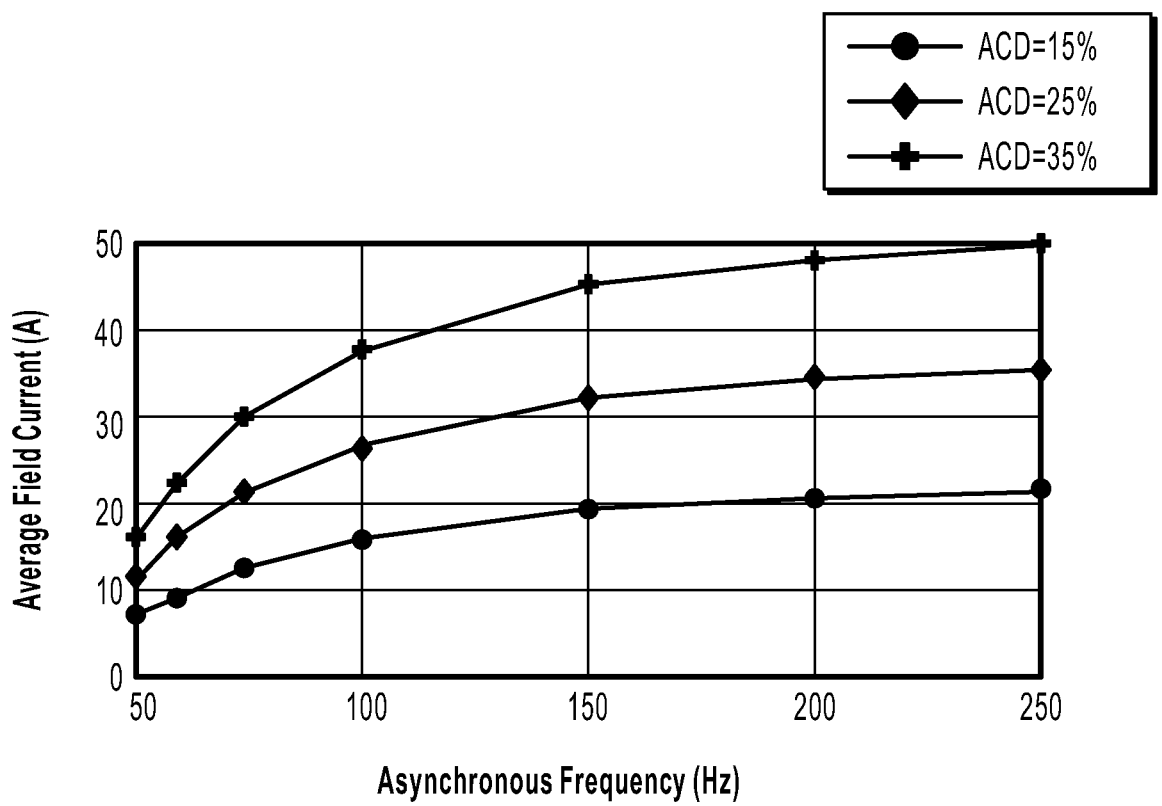
FIG. 10B illustrates the impact of current distribution and asynchronous harmonic frequency with linear BH curve characteristics on average field current.
Figure 10C:
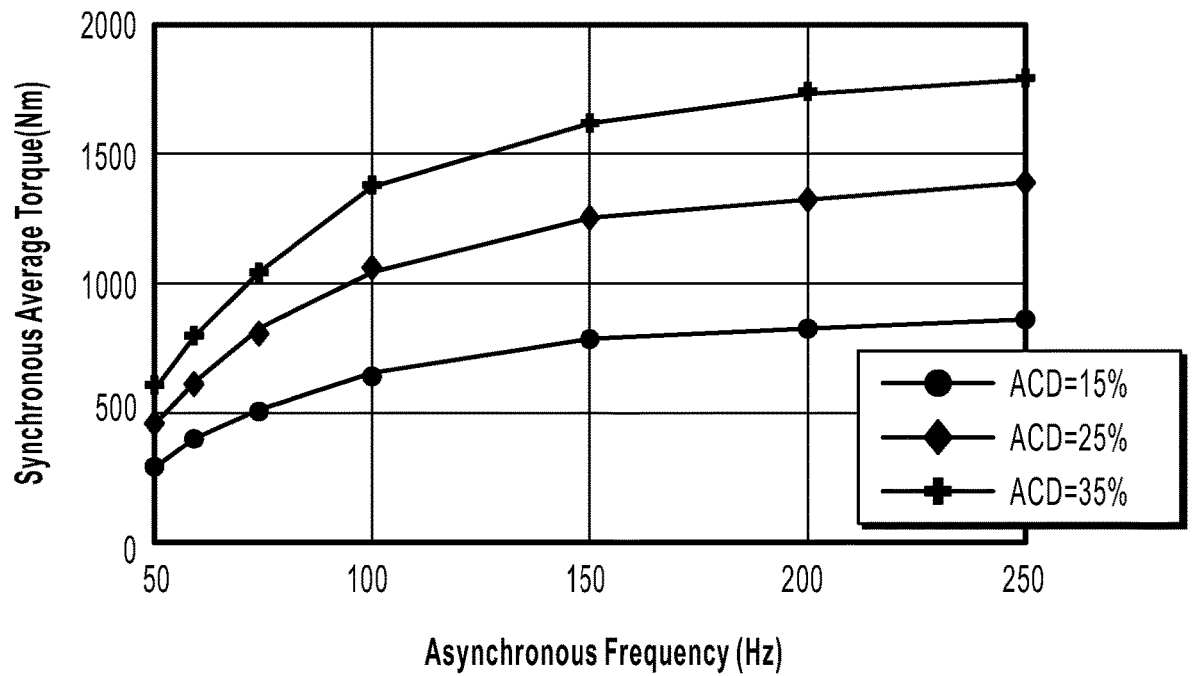
FIG. 10C illustrates the impact of current distribution and asynchronous harmonic frequency with linear BH curve characteristics on torque of the synchronous portion of the machine.
Figure 10D:
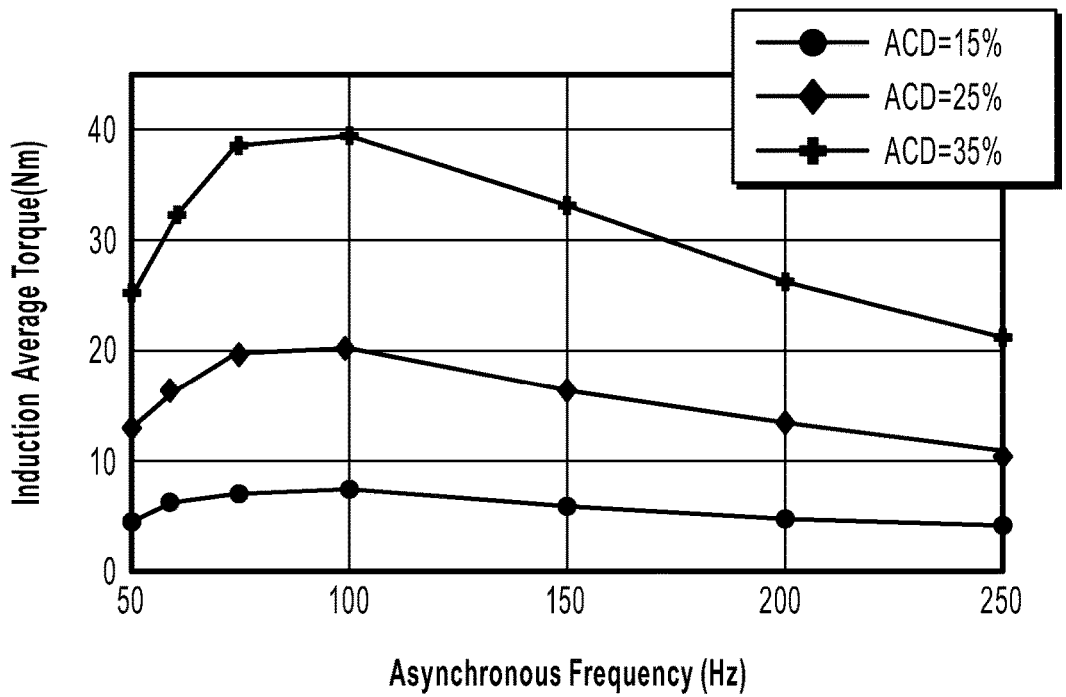
FIG. 10D illustrates the impact of current distribution and asynchronous harmonic frequency with linear magnetic field/magnetic flux density curve characteristics on torque of the induction portion of the machine.

FIG. 10A shows the results from the same set of simulations with a linear BH curve used for the stator and rotor cores. In the case without saturation, the torque of the overall brushless wound field synchronous machine 100 is the sum of the synchronous and induction torques. Additionally, the synchronous torque is proportional to the field current, so the 35% asynchronous current distribution does yield the largest torques. FIG. 10B shows that the average field current follows a similar trend as the average torques in FIG. 10A; however, for the same slip frequency, increasing the asynchronous current distribution results in higher changes in average field current value than in the nonlinear simulations results. FIGS. 10C and 10D shows the synchronous and induction torques, respectively, for the linear BH curve simulations. FIG. 10D indicates that the slip frequency where the maximum induction torque occurs is shifted relative to FIG. 8B due to a larger rotor leakage inductance in the linear case.

Figure 11:
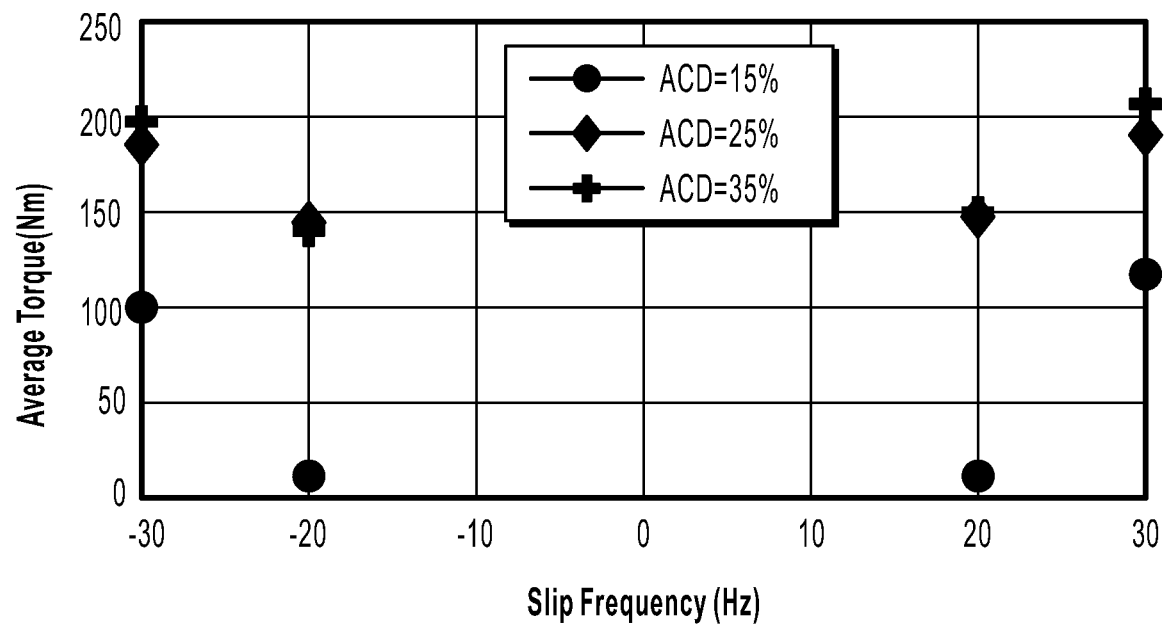
FIG. 11 illustrates the impact of asynchronous current distribution and slip frequency on the average torque of the synergistically excited brushless wound field synchronous machine for positive and negative slip frequencies.

The brushless wound field synchronous machine 100 can also be operated with negative slip frequency using an asynchronous current frequency lower than the synchronous frequency of the rotor, which is 30 Hz for 1800 RPM, for example. This will still induce a current in the induction winding 114 of the rotor 104, which excites the rotor field winding 118. However, the negative slip frequency will result in negative induction torque, which reduces the overall torque. FIG. 11 compares the average torque with positive and negative slip frequencies with the same magnitudes in each case. While this negative slip frequency does reduce the torque, it can also reduce the voltage requirements of the inverter, especially at high rotor speeds.

The brushless wound field synchronous machine 100 has advantages over current traction motors. The brushless wound field synchronous machine 100 does not require rare-earth materials, which have volatile prices, and the field current can be controlled to reduce losses at high speeds, unlike a permanent magnet motor. Additionally, the brushless wound field synchronous machine 100 does not require brushes or a separate rotary transformer to excite the field current. Instead, the brushless wound field synchronous machine 100 only requires the rectifier 116 and an extra set of windings on the rotor 104; however, these windings also contribute to the overall torque of the brushless wound field synchronous machine 100.

As a multiphase machine, the brushless wound field synchronous machine 100 does require more switches in the inverter, but the current rating of each switch is reduced. Furthermore, the inverter for the brushless wound field synchronous machine 100 can be created from three conventional six-switch inverters. Thus, the brushless wound field synchronous machine 100 offers the potential for a low-cost, high-performance traction motor that requires minimal changes to existing manufacturing practices and inverter design. The primary changes that would be required to use the brushless wound field synchronous machine 100 with existing hardware would be to use three smaller inverters, instead of a single larger inverter, and to adjust the control algorithm driving the inverters.

Relative to wound field synchronous machines with brushes, the brushless wound field synchronous machine 100 will require significantly less maintenance. Relative to brushless wound field synchronous machines with a separate wireless power transfer section, the brushless wound field synchronous machine 100 would be smaller. Additionally, the excitation of rotor current can also be used to generate useful torque by operating as an induction machine.

Relative to using existing harmonics or injecting additional harmonics into the machine to excite current on the rotor 104, the brushless wound field synchronous machine 100 exhibits reduced torque ripple (and, thus, reduced vibrations and noise). Additionally, the excitation of rotor current can also be used to generate useful torque by operating as an induction machine.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an," and other singular terms are intended to include the plural forms thereof unless specifically excluded.

What is claimed is:

1. An electric machine comprising:
   a stator having a stator winding disposed thereon;
   a rotor;
   a field winding disposed on the rotor;
   an induction winding disposed on the rotor;
   a rectifier electrically coupled to the induction winding and the field winding;
   wherein, upon application of a voltage to the stator winding, the stator winding produces a first rotating magnetic field and an independently controlled second rotating magnetic field that has a different spatial frequency than the first rotating magnetic field;
   wherein, the first rotating magnetic field interacts asynchronously with the induction winding to produce an alternating current in the induction winding;
   wherein, the rectifier changes the alternating current to a direct current that is supplied to the field winding; and
   wherein the field winding interacts synchronously with the second rotating magnetic field.

2. The electric machine of claim 1, wherein the stator winding comprises multiple phases.

3. The electric machine of claim 2, wherein each phase of the stator winding conducts a current that is a sum of two different current waveforms.

4. The electric machine of claim 3, wherein the magnitude and frequency of the two different current waveforms facilitate independent control of the first rotating magnetic field and the second rotating magnetic field.

5. The electric machine of claim 1, wherein the induction winding is a two-pole, three-phase winding.

6. The electric machine of claim 1, wherein the field winding is a six-pole, single-phase winding.

7. The electric machine of claim 1, wherein the stator winding functions as a nine-phase two pole winding and a six-phase, three-pole winding.

8. The electric machine of claim 1, wherein the rotor is disposed within the stator.

9. The electric machine of claim 1, wherein the stator is disposed within the rotor.

10. The electric machine of claim 1, wherein the field winding is disposed within the induction winding.

11. The electric machine of claim 1, wherein the rotor is disposed within the stator.

12. The electric machine of claim 1, wherein the stator is disposed within the rotor.

13. A method of generating torque utilizing an electric machine, the method comprising:
    applying a voltage to a stator winding;
    producing, via the stator winding, a first rotating magnetic field;
    producing, via the stator winding, a second rotating magnetic field that has a different spatial frequency than the first rotating magnetic field;
    inducing an alternating current in an induction winding in a rotor through asynchronous interaction of the induction winding with the first rotating magnetic field;
    rectifying the alternating current to a direct current;
    supplying the direct current to a field winding on the rotor; and
    producing torque through synchronous interaction of the field winding with the second rotating magnetic field.

14. The method of claim 13, comprising simultaneous operating the stator winding as a nine-phase two-pole winding and a three-phase, six-pole winding.

15. The method of claim 13, wherein producing the second rotating magnetic field comprises injecting zero-sequence current into a phase of the stator winding.

16. The method of claim 13, wherein the field winding is disposed within the induction winding.

17. The method of claim 13, wherein the induction winding is a two-pole, three-phase winding.

18. The method of claim 13, wherein the field winding is a six-pole, single-phase winding.

19. An electric powertrain comprising:
   a multiphase inverter;
   an electric machine electrically coupled to the multiphase inverter, the electric machine comprising:
      a stator having a stator winding disposed thereon;
      a rotor;
      a field winding disposed on the rotor;
      an induction winding disposed on the rotor;
      a rectifier electrically coupled to the induction winding and the field winding;
   wherein, upon application of a voltage to the stator winding, the stator winding produces a first rotating magnetic field and an independently controlled second rotating magnetic field that has a different spatial frequency than the first rotating magnetic field;
   wherein, the first rotating magnetic field interacts asynchronously with the induction winding to produce an alternating current in the induction winding;
   wherein, the rectifier changes the alternating current to a direct current that is supplied to the field winding; and
   wherein the field winding interacts synchronously with the second rotating magnetic field.

20. The electric powertrain of claim 19, wherein the multiphase inverter comprises multiple three-phase inverters.

* * * * *